Sept. 22, 1953 L. J. MATTINGLY 2,653,226

AUTOMATIC GAIN CONTROL SYSTEM

Filed Aug. 20, 1949

Inventor
Lawrence J. Mattingly
By Foorman L. Mueller
Atty.

Patented Sept. 22, 1953 2,653,226

UNITED STATES PATENT OFFICE 2,653,226

AUTOMATIC GAIN CONTROL SYSTEM

Lawrence J. Mattingly, Lombard, Ill., assignor to Motorola, Inc., Chicago, Ill., a corporation of Illinois Application August 20, 1949, Serial No. 111,468

8 Claims. (Cl. 250—20)

This invention relates to automatic gain control (AGC) systems, and particularly to means for adjusting the operation of an AGC system to the level of the incoming signal.

Automatic gain control is employed commonly in television receivers to vary the sensitivity of the receiver in response to fluctuations in the strength of an incoming carrier signal. If the signal becomes weak, the automatic gain control slightly increases the sensitivity of the receiver to compensate for the decrease in signal strength. Conversely, if the signal becomes stronger, the sensitivity is decreased in a compensating manner. Difficulty is experienced in designing an AGC system which will serve equally well to control the sensitivity of the receiver for high-level signals coming from a nearby station and for low-level signals coming from a more distant station. If the AGC system is designed to stabilize high-level signals, it also tends to reduce the sensitivity of the receiver for low-level signals, where the most sensitivity is needed.

An object of this invention is to provide an improved automatic gain control system in which the AGC action is dependent upon the input signal level, there being less AGC action for consistently weak signals than for consistently strong signals.

Another object is to provide an improved automatic gain control system which takes effect only when the signal intensity is above a certain threshold value, and still another object is to adjust this threshold value to the level of the incoming signal, whereby it is relatively high for weak signals and relatively low for strong signals.

A further object is to provide an automatic gain control system for a television receiver in which the AGC action is related to the gain of the video amplifier.

A feature of the invention is the provision of a video contrast control which also governs the AGC threshold so that for a high-gain setting of the contrast control (weak signal) the threshold is higher than it is for a low-gain setting of the contrast control (strong signal).

Another feature is the provision of a video contrast control which furnishes a variable positive bias to oppose the negative AGC bias, such positive bias being the greatest when the contrast control is set for high gain and being the least when the contrast control is set for the least gain.

Figure 1:
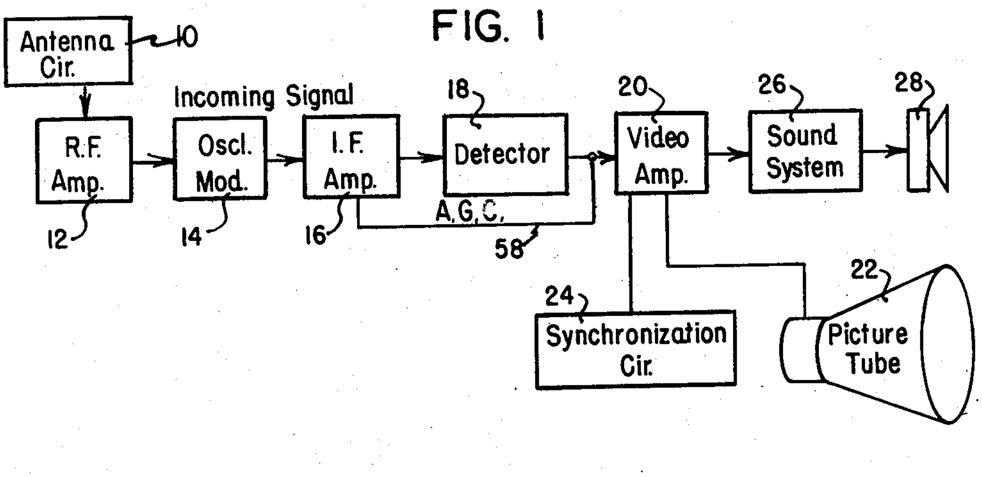
Figure 2:
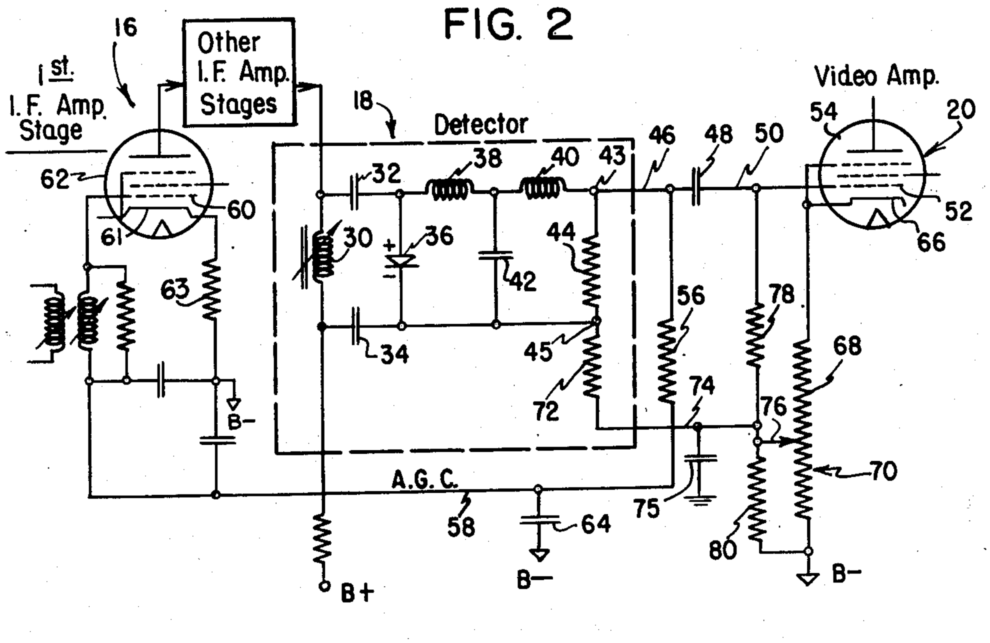

The foregoing and other objects and features of the invention will be better understood from the following detailed description taken in connection with the accompanying drawing, wherein:

Fig. 1 is a block diagram of a television receiver in which the invention may be utilized; and Fig. 2 is a schematic illustration of an automatic gain control system which embodies the principles of the invention, such system being incorporated in the television receiver of Fig. 1.

In practicing the invention, negative AGC voltage is derived from the output side of the second detector and is applied to one or more stages of the intermediate-frequency amplifier to control the gain thereof. This negative AGC voltage is opposed by a positive voltage derived from the video contrast control. The contrast control is of the type which controls the gain of the video amplifier by varying the amount of negative feedback in the cathode circuit of this amplifier. This is accomplished by the use of a potentiometer having a resistance winding connected in series with the cathode. The movable contact of this potentiometer is connected to the grid return of the video amplifier, and it is coupled to the negative or B— terminal of the power supply through a resistor of predetermined value across which the aforesaid positive bias is developed.

Referring to Fig. 1, the television receiver there illustrated is of the intercarrier sound type, although the principles of the invention are not limited to this particular type of receiver. The wave signal picked up by the antenna circuit 10 is amplified by a radio freqency amplifier 12 and is then converted to an intermediate-frequency signal by the oscillator-modulator 14. The intermediate-frequency signal, consisting of the video intermediate-frequency carrier and the sound intermediate-frequency carrier, is amplified by the intermediate-frequency amplifier 16 and then is detected by the second detector 18. The output of the detector 18 is a mixed signal consisting of a video wave and an intermediate-frequency sound wave, the latter being a frequency modulated signal with a mean frequency of 4.5 megacycles (the difference between the video intermediate frequency and the sound intermediate frequency). The mixed signal is amplified by the video amplifier 20. The video wave is applied to the television picture tube 22, while the synchronizing pulses in the video wave are applied to a synchronization circuit 24 that controls the horizontal and vertical sweep systems (not shown) for the picture tube 22. The I. F. sound signal passes to the sound system 26, where it is demodulated and fed to a sound reproducer such as the loudspeaker 28.

Referring now to Fig. 2, the intermediate-frequency amplifier 16 may consist of several stages, of which the first stage is partially illustrated in this view. The detector 18 has an input choke 30 which is coupled by capacitors 32 and 34 to a half-wave rectifier 36, the polarity of which is as indicated. This rectifier also acts as a converter, providing a difference-frequency beat of 4.5 megacycles between the video I. F. carrier and the sound I. F. carrier. The chokes 38 and 40, together with the capacitor 42, form a low-pass filter to eliminate the I. F. component and I. F. harmonics. A load resistor 44 is connected across the output terminals 43 and 45 of this rectifier-filter network.

The action of the rectifier-filter network in the detector 18 is such that the output terminal 43 thereof is at a lower potential than the output terminal 45. The low-potential terminal 43 is coupled through a conductor 46, a blocking capacitor 48 and a conductor 50 to the control grid 52 of the amplifier tube 54 in the video amplifier 20, a portion of which is shown in Fig. 2. The conductor 46 is also connected through a resistor 56 to the AGC (automatic gain control) line 58 that leads to the control grid 60 of the amplifier tube 62 in the first intermediate-frequency amplifier stage. The cathode 61 of this tube is connected to B minus through resistor 63. If desired, the AGC line 58 may be connected also to other intermediate-frequency amplifier stages or to a radio-frequency amplifier stage. The resistor 56, together with a bypass capacitor 64, serves to filter the video and I. F. components from the AGC voltage, leaving a negative direct-current bias in the line 58.

The action of the automatic gain control system illustrated in Fig. 2 is such that it tends to stabilize the average value of the detected signal furnished by the detector 18. If the incoming signal (that is, the radio-frequency carrier) should change in value due, for example, to changing conditions at the transmitting station or to atmospheric variations, the AGC bias automatically changes the gain in a compensating fashion. Thus, for instance, if the signal becomes stronger, the negative bias increases, causing the gain of the intermediate-frequency amplifier 16 to decrease so that the detected signal is restored to its original intensity. Such action is familiar to those skilled in the art.

A disadvantage of conventional AGC systems is that many weak signals are obliterated or attenuated to a point where they are not clearly perceptible. Such signals may come from a distant transmitter, causing the incoming signal level to be very low compared with the level of signals coming from transmitters that are closer to the receiver. When receiving such weak signals, it is desirable in many instances that the action of the AGC system be suspended or nullified so long as the signal strength is below a certain level. It is desirable also to modify the AGC action even when receiving signals of medium strength, to prevent a complete loss of the picture and sound if the incoming signal should fade beyond a certain point without disappearing altogether.

The present invention makes provision for adjusting the action of the automatic gain control system to the level of the incoming signal. This adjustment is effected by the contrast control of the video amplifier 20. As shown in Fig. 2, the cathode 66 of the video amplifier tube 54 is connected to one end of the resistance winding 68 in a contrast control potentiometer 70. The other end of this resistance winding 68 is connected to the negative or B— terminal of the direct current power supply (not shown). The high-potential terminal 45 of the rectifier-filter network in the detector 18 is connected through a resistor 72 and a conductor 74 (bypassed by a capacitor 75) to the movable contact 76 that cooperates with the resistance winding 68 of the potentiometer 70. The grid coupling resistor 78 of the video amplifier 20 is connected between the conductor 50 and the movable contact 76. The resistor 72 and capacitor 75 prevent the possibility of regeneration by adequately isolating the detector 18.

When strong signals are being received, the contrast control potentiometer 70 is adjusted to reduce the gain of the video amplifier for obtaining proper contrast between the light areas and dark areas of the television picture. This is done by moving the contact 76 toward the B— end of the resistance winding 68, thus obtaining a large amount of negative feedback and thereby decreasing the gain of the amplifier 20. When weak signals are being received, on the other hand, it is desirable that the gain of the video amplifier be high in order that the proper contrast be obtained. Hence, the contact 76 is moved toward the cathode end of the resistance winding 68, thus reducing the negative feedback and raising the gain.

In accordance with the present invention, the movable contact 76 of the contrast control potentiometer 70 is connected to B— by a resistor 80, in which is developed a variable amount of positive bias to oppose the negative AGC bias furnished by the detector 18. The value of this resistor 80 is fairly low, for example, 180 ohms as compared with 2,000 ohms in the resistance winding 68. With the contrast control potentiometer set for maximum gain (movable contact 76 at the upper end of the winding 68, Fig. 2) to receive an extremely weak signal, the entire resistance winding 68 is shunted by the resistor 80. Since the output of the detector 18 is being applied directly between the grid 52 and the cathode 66 of the amplifier tube 54, there is no degenerative or negative feedback under these circumstances. However, there is a definite positive voltage developed in the resistor 80 which tends to oppose the negative AGC bias that otherwise would be furnished by the detector 18. In actual practice this positive bias may amount to about 2½ volts. Under the conditions of no signal, this positive bias voltage would be applied through the detector load resistor 44 to the point 46 so that a positive voltage would be applied by the automatic gain control circuit to the grid of the intermediate frequency amplifier 16. However, the resistor 56 of the automatic gain control circuit is large so that the positive bias applied to the grid is very small and the effect thereof may be disregarded. As a signal is applied to the detector, a negative voltage is developed across the detector load 34 and is combined with the positive bias from resistor 80 to provide the voltage at point 46 which is applied to the automatic gain control circuit. This voltage will become negative with respect to B minus when the signal is of such a level that the voltage across resistor 44 is greater than the bias produced across resistor 80. This means that the gain of the intermediate-frequency amplifier 16 is not automatically controlled where the incoming signal level is so low that less than 2½ volts of AGC bias is obtained. Hence, the picture and the sound may vary in their respective intensities, but on the other hand, they will not be obliterated by the action of the AGC system.

For extremely strong signals, the video amplifier 20 is adjusted for minimum gain by setting the contact 76 of the contrast control potentiometer 70 at the lower end of the resistance winding 68, Fig. 2. This causes the resistor 80 to be short-circuited so that no positive bias is developed therein. Under these conditions the video amplifier 20 has a maximum amount of negative feedback, and the AGC threshold is reduced to zero. That is to say, the AGC system acts to offset any fluctuations whatsoever in the strength of the incoming signal at high level. For intermediate settings of the contrast control potentiometer 76, the bias developed in the resistor 80 will have intermediate values between the two extremes previously mentioned, and the AGC threshold varies accordingly. Under these conditions the AGC system may be effective so long as the signal fluctuations are within a certain range, and ineffective when the signal strength drops below a certain value, so that the signal is not lost altogether.

It is to be noted that the positive bias developed across resistor 80 which forms a part of the automatic gain control voltage, does not bias the detector itself. This is desirable since the application of such a bias to the detector might make it operate on a non-linear portion of its characteristic to thereby introduce distortion of the signal. Further, the output of the detector, which is applied to the video amplifier, is not biased since the detector output is applied between the grid 52 and the cathode 66 of the video amplifier and the bias voltage developed across resistor 80 does not effect this circuit.

While there has been described what is at present considered to be the preferred embodiment of the invention, it will be understood that various modifications thereof may be made within the true spirit and scope of the invention as defined in the appended claims.

I claim:

1. In a receiver for modulated carrier waves having a power supply with positive and negative terminals, the combination of a modulated wave amplifier including a tube having a control grid and a cathode, with said cathode being connected to said negative power supply terminal and said grid being adapted to vary the gain of said amplifier as the bias voltage of said grid with respect to said cathode is varied, a detector for demodulating the wave amplified by said modulated wave amplifier, said detector including rectifier-filter means having a high-potential output terminal and a low-potential output terminal, a detected signal amplifier including a tube having a grid coupled to said low-potential terminal of said detector and also having a cathode, a resistance element connected at one end thereof to the cathode of said signal amplifier tube and connected at the other end thereof to the negative power supply terminal, a movable contact cooperating with said resistance element, means connecting said movable contact to the high-potential terminal of said detector, so that a variable portion of said resistance element is connected in a series circuit with said detector output terminals between said grid and said cathode and the setting of said contact controls the resistance of said series circuit and thereby controls the gain of said signal amplifier, a resistor connecting said movable contact to said negative power supply terminal, said resistor developing a voltage which varies in accordance with the setting of said contact, and means coupling said low-potential terminal to the grid of said modulated wave amplifier tube for automatically applying a bias voltage thereto which varies with the voltage developed across said resistor in series with the voltage between said output terminals of said detector.

2. In a receiver for modulated carrier waves having a power supply with positive and negative terminals, a modulated wave amplifier including a tube having a control grid and a cathode, with said cathode being connected to said negative power supply terminal and said grid being adapted to vary the gain of said amplifier as the bias voltage of said grid with respect to said cathode is varied, a detector for demodulating the wave amplified by said modulated wave amplifier, said detector including rectifier-filter means having a high-potential outlet terminal and a low-potential output terminal between which is developed the modulating signal and a direct current voltage which varies with the strength of the modulated carrier wave, means coupling said low-potential terminal to the grid of said modulated wave amplifier tube for automatically providing a bias voltage thereto, a detected signal amplifier including a tube having a grid coupled to said low-potential terminal of said detector and also having a cathode, means including a resistor connecting the high-potential terminal of said detector to said negative power supply terminal, and variable resistance means connecting said high-potential terminal to said cathode of said signal amplifier to control the gain of said signal amplifier, said resistor providing a voltage thereacross which varies with the setting of said variable resistance means and in the same sense as the gain of said detected signal amplifier, and direct current coupling means connected to said low potential terminal of said detector for combining the voltage across said resistor and the direct current voltage at said detector terminals to provide a voltage varying with respect to the potential of said negative power supply terminal, said direct current coupling means being connected to said control grid of said modulated wave amplifier for applying said combined voltage between said control grid and said cathode for controlling the gain thereof.

3. In a television receiver having a power supply with positive and negative terminals thereof, an intermediate-frequency amplifier including a tube with a cathode and a control grid therein, said cathode being connected to said negative power supply terminal, a second detector for demodulating amplified intermediate-frequency signals, said detector having rectifier-filter means with high-potential and low-potential output terminals, means connecting said low-potential output terminal to the grid of said intermediate-frequency amplifier tube, a video amplifier including an amplifier tube having a control grid and a cathode therein, means coupling the control grid of said video amplifier tube to said low-potential output terminal, a contrast control potentiometer including a resistance element connected at one end thereof to said cathode and connected at the other end thereof to said negative power supply terminal, a movable contact cooperating with said resistance element, means coupling said movable contact to the high-potential terminal of said detector, and a resistor connecting said movable contact to said negative power supply terminal so that the voltage thereacross depends upon the setting of said movable contact of said potentiometer, said connecting means applying the voltage at said output terminals of said second detector and the voltage across said resistor in series from said low-potential terminal to said grid of said intermediate-frequency amplifier tube for controlling the gain thereof.

4. A receiver for modulated carrier waves including in combination, a modulated wave amplifier, a detector for demodulating the amplified waves to produce the modulating signal and a direct current voltage which varies with the strength of the modulated carrier wave, said detector having rectifier-filter means with a high-potential output terminal and a low-potential output terminal, a modulated signal amplifier of the negative feedback type having an amplifier tube with a cathode and a control grid, a gain control potentiometer including a resistance element and a movable contact cooperating with said resistance element, said resistance element having one terminal thereof connected to said cathode and the other terminal thereof connected to a reference potential, with the gain of said modulating signal amplifier varying with the position of said movable contact, means coupling said low-potential output terminal of said detector to said control grid, means connecting said high-potential terminal of said detector to said movable contact, said movable contact being positioned at the end of said resistance element connected to said cathode to provide high gain for signals of low amplitude and being positioned at the end of said resistance element connected to said reference potential to provide low gain for signals of high amplitude, and resistor means connected between said movable contact and said reference potential for producing a voltage thereacross which varies from a predetermined value when said movable contact is at the end of said resistance element connected to said cathode to zero value when said contact is at said end of said resistance element connected to said reference potential, and gain control means for applying the voltage between said reference potential and said low-potential terminal of said detector to said modulated wave amplifier for controlling the gain thereof, said voltage across said resistor means opposing the voltage across said output terminals of said detector to reduce the gain control effect for signals of low amplitude and having substantially no effect on the gain control for signals of high amplitude.

5. A televison receiver including in combination, an intermediate-frequency wave amplifier, a detector for demodulating the amplified intermediate-frequency waves to produce the modulated signal and a negative direct current voltage which varies with the strength of the modulated carrier wave, a video amplifier of the negative feedback type having an amplifier tube with a cathode and a control grid, a gain control potentiometer including a resistance element and a movable contact cooperating with said resistance element, said resistance element having one terminal thereof connected to said cathode and the other terminal thereof connected to a reference potential, circuit means for applying the modulated signal from said detector between said movable contact and said control grid, the gain of said video amplifier depending upon the position of said movable contact with said movable contact being positioned at the end of said resistance element connected to said cathode to provide high gain for signals of low amplitude and being positioned at the end of said resistance element connected to said reference potential to provide low gain for signals of high amplitude, and resistor means connected between said movable contact and said reference potential for producing a positive voltage which varies from a predetermined value when said movable contact is at the end of said resistance element connected to said cathode to zero value when said contact is at said end of said resistance element connected to said reference potential, and a gain control circuit connected to said reference potential and to said detector for combining the positive voltage across said resistor means and the negative direct current voltage from said detector and for applying the combined voltage to said modulated wave amplifier for controlling the gain thereof, said gain control circuit providing a reduced gain control effect for signals of low amplitude as compared to signals of high amplitude.

6. In a receiver for modulated carrier waves the combination including, a modulated wave amplifier including a tube having a control grid and a cathode with the cathode being connected to a reference potential, a detector coupled to said modulated wave amplifier including rectifier-filter means having first and second output terminals across which is developed the modulating signal and a direct current voltage varying with the amplitude of the carrier wave, a detected signal amplifier including a tube having a grid and a cathode, variable resistor means including first and second variable resistance portions each having an end terminal and with a common tap therebetween, said end terminal of said first resistance portion being connected to said cathode of said detected signal amplifier tube, said second end terminal of said resistance portion being connected to said reference potential, means coupling said first and second output terminals of said detector respectively to said grid of said detected signal amplifier tube and to said common tap of said resistor means, so that the detected modulating signal is applied to said detected signal amplifier and is amplified therein, and direct current means coupling said first terminal of said detector to said grid of said modulated wave amplifier, so that the voltage across said second resistance portion is combined with the direct current across said detector terminals to provide a voltage varying with respect to said reference potential for controlling the gain of said modulated wave amplifier.

7. In a receiver for modulated carrier waves the combination including, a modulated wave amplifier including a tube having a control grid and a cathode with the cathode being connected to a reference potential, a detector coupled to said modulated wave amplifier including rectifier-filter means having first and second output terminals across which is developed the modulating signal and a direct current voltage of one polarity varying with the amplitude of the carrier wave, a detected signal amplifier including a tube having a grid and a cathode, variable resistor means including first and second series connected variable resistance portions having a common tap therebetween, with said first resistance portion being connected to said cathode of said detected signal amplifier tube and said second resistance portion being connected to said reference potential, means for simultaneously adjusting the value of said first and second resistance portions for controlling the gain of said detected signal amplifier, with the voltage across said second resistance portion being of a polarity opposite to said one polarity and varying with the gain of said detected signal amplifier, means coupling said first and second terminals of said detector respectively to said grid of said detected signal amplifier tube and to said common tap of said resistor means, so that the detected modulating signal is applied to said detected signal amplifier and is amplified therein, and direct current means coupling said first terminal of said detector to said grid of said modulated wave amplifier, so that the voltage across said second resistance portion and the direct current voltage at said detector terminals are combined in opposite polarity to provide a voltage varying with respect to said reference potential for controlling the gain of said modulated wave amplifier.

8. In a receiver for modulated carrier waves, a modulated wave amplifier, a single detector for demodulating the amplified wave to produce both a modulation signal and a direct-current voltage which varies with the strength of the modulated carrier wave, a modulation signal amplifier having a degenerative feedback circuit with manual control means for adjusting the degeneration thereof and thereby adjusting the gain of said modulation signal amplifier, a voltage-developing element connected to said feedback circuit and governed by said manual control means for producing a control voltage of variable magnitude in accordance with the setting of said manual control means, with said control voltage increasing and decreasing with the gain of said modulation signal amplifier, means for combining the direct current voltage produced by said detector with the voltage developed in said element, and means for applying the combined voltages to said modulated wave amplifier for automatically controlling the gain thereof in accordance with said combined voltages.

LAWRENCE J. MATTINGLY.

References Cited in the file of this patent

UNITED STATES PATENTS

| Number | Name | Date |
|---|---|---|
| 2,022,972 | Nebel | Dec. 3, 1935 |
| 2,043,582 | Fowler | June 9, 1936 |
| 2,121,427 | Fowler | June 21, 1938 |
| 2,145,372 | Riddle, Jr. | Jan. 31, 1939 |
| 2,259,998 | Brown | Oct. 21, 1941 |
| 2,500,505 | Arnold, Jr. | Mar. 14, 1950 |